April 19, 1960     W. R. POTTS     2,933,343
VEHICLE CRASH CURTAIN

Filed Jan. 3, 1958     3 Sheets-Sheet 1

INVENTOR.
WILLIAM R. POTTS,
BY
McMorrow, Berman & Davidson
ATTORNEYS.

April 19, 1960
W. R. POTTS
2,933,343
VEHICLE CRASH CURTAIN
Filed Jan. 3, 1958
3 Sheets-Sheet 2
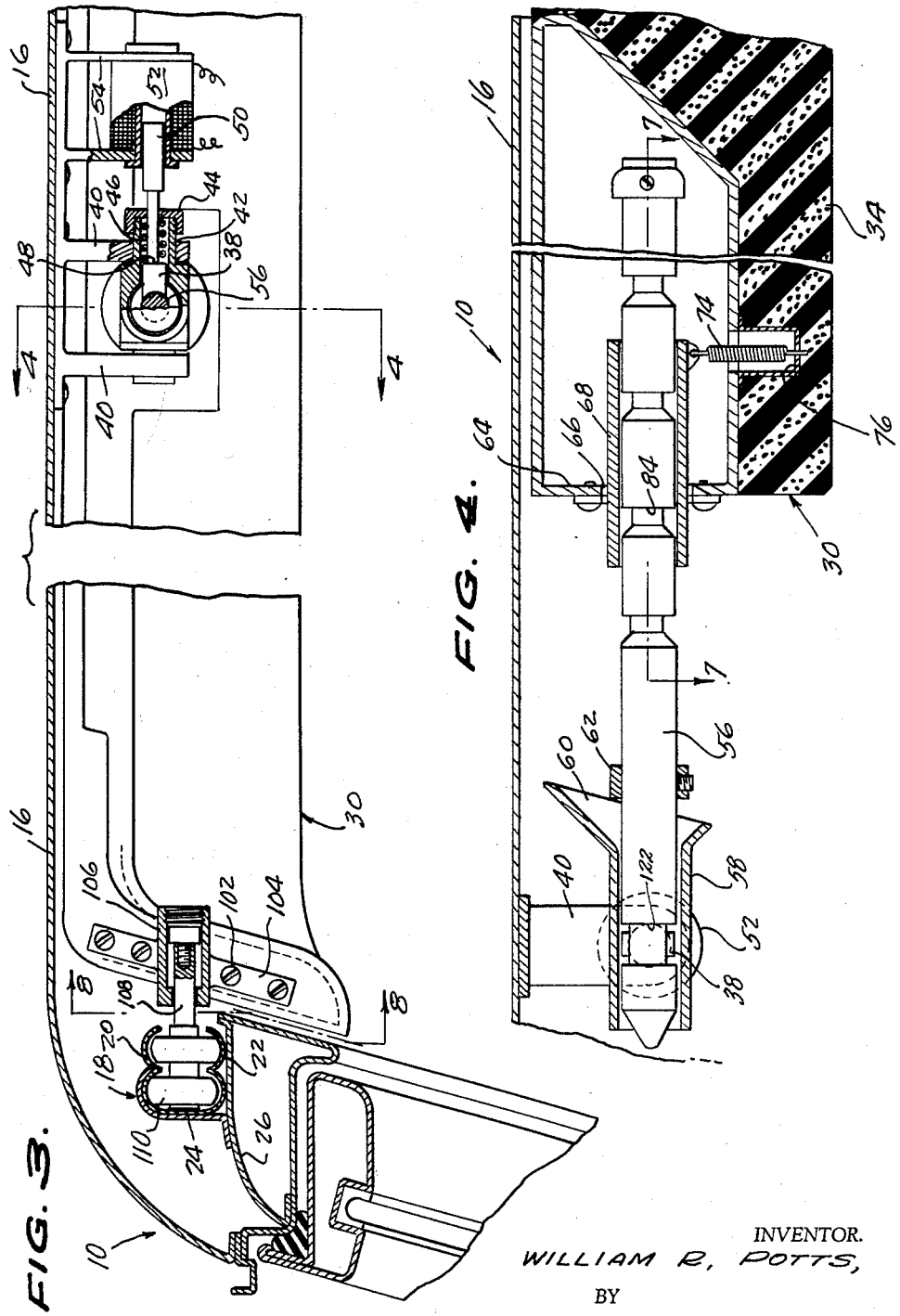
INVENTOR.
WILLIAM R. POTTS,
BY
M. Morrow, Berman & Davidson
ATTORNEYS.

April 19, 1960 W. R. POTTS 2,933,343
VEHICLE CRASH CURTAIN
Filed Jan. 3, 1958 3 Sheets-Sheet 3
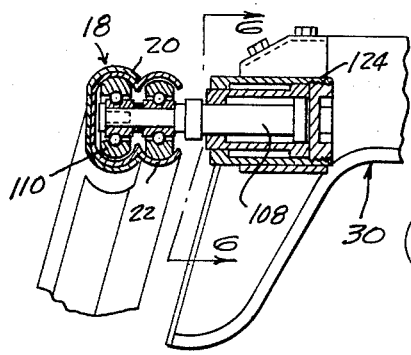
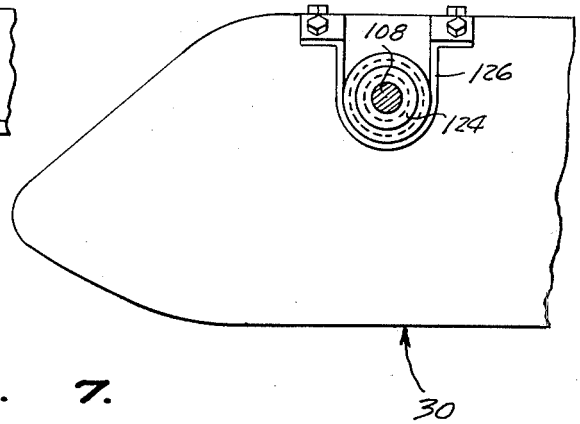
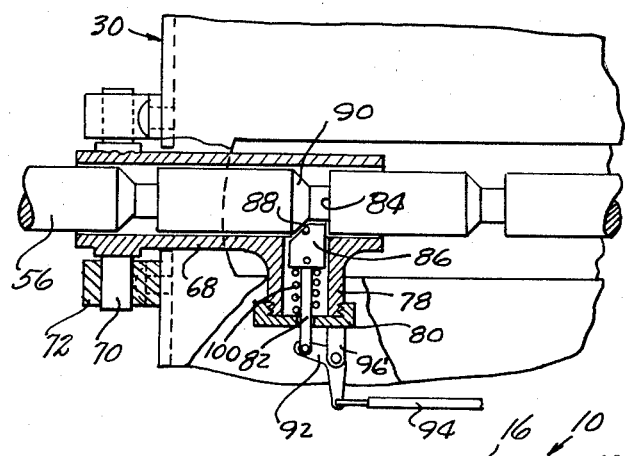
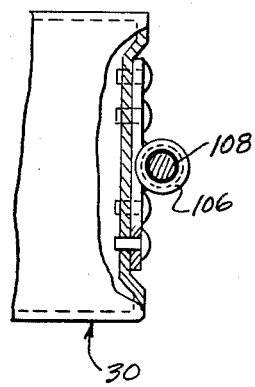
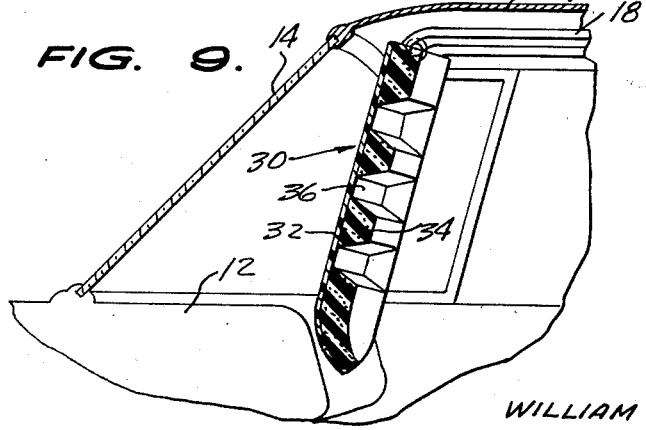
INVENTOR.
WILLIAM R. POTTS,
BY
McMorrow, Berman & Davidson
ATTORNEYS.

United States Patent Office 2,933,343
Patented Apr. 19, 1960

2,933,343

VEHICLE CRASH CURTAIN

William R. Potts, Brantford, Ontario, Canada

Application January 3, 1958, Serial No. 706,956

2 Claims. (Cl. 296—84)

The present invention relates to a crash curtain for installation in a vehicle for the protection of the occupants of the vehicle during sudden deceleration movements of the vehicle.

An object of the present invention is to provide a crash curtain for installation in a vehicle which lends itself to automatic operation upon cessation of forward movement of the vehicle or a sudden deceleration of the vehicle due to collision or sudden braking which frequently results in the occupants striking their heads on the vehicle windshield.

Another object of the present invention is to provide a crash curtain for installation in a vehicle which lends itself to ready adjustment downwardly to serve as a sun visor when desired, one which does not totally obscure the forward vision of the occupants of the vehicle when in the down position and one which is highly effective in action.

A further object of the present invention is to provide a crash curtain for installation in a vehicle which is sturdy in construction, one simple in structure easily incorporated in the structure of the vehicle, and one which is economically feasible.

These and other objects and advantages of the present invention will be fully apparent from the following description when taken in connection with the annexed drawings, in which:

Figure 3 is a sectional view, on an enlarged scale, taken on the line 3—3 of Figure 1;

Figure 4 is a sectional view, on an enlarged scale, taken on the line 4—4 of Figure 3;

Figure 5 is a fragmentary view partially in section showing the roller mounting means of the crash curtain of the present invention;

Figure 6 is a fragmentary sectional view taken on the line 6—6 of Figure 5;

Figure 7 is a sectional view on an enlarged scale taken on the line 7—7 of Figure 4;

Figure 8 is a sectional view taken on the line 8—8 of Figure 3; and

Figure 9 is a sectional view, in elevation, showing the crash curtain of the present invention in the down position.

Figures 1, 2:
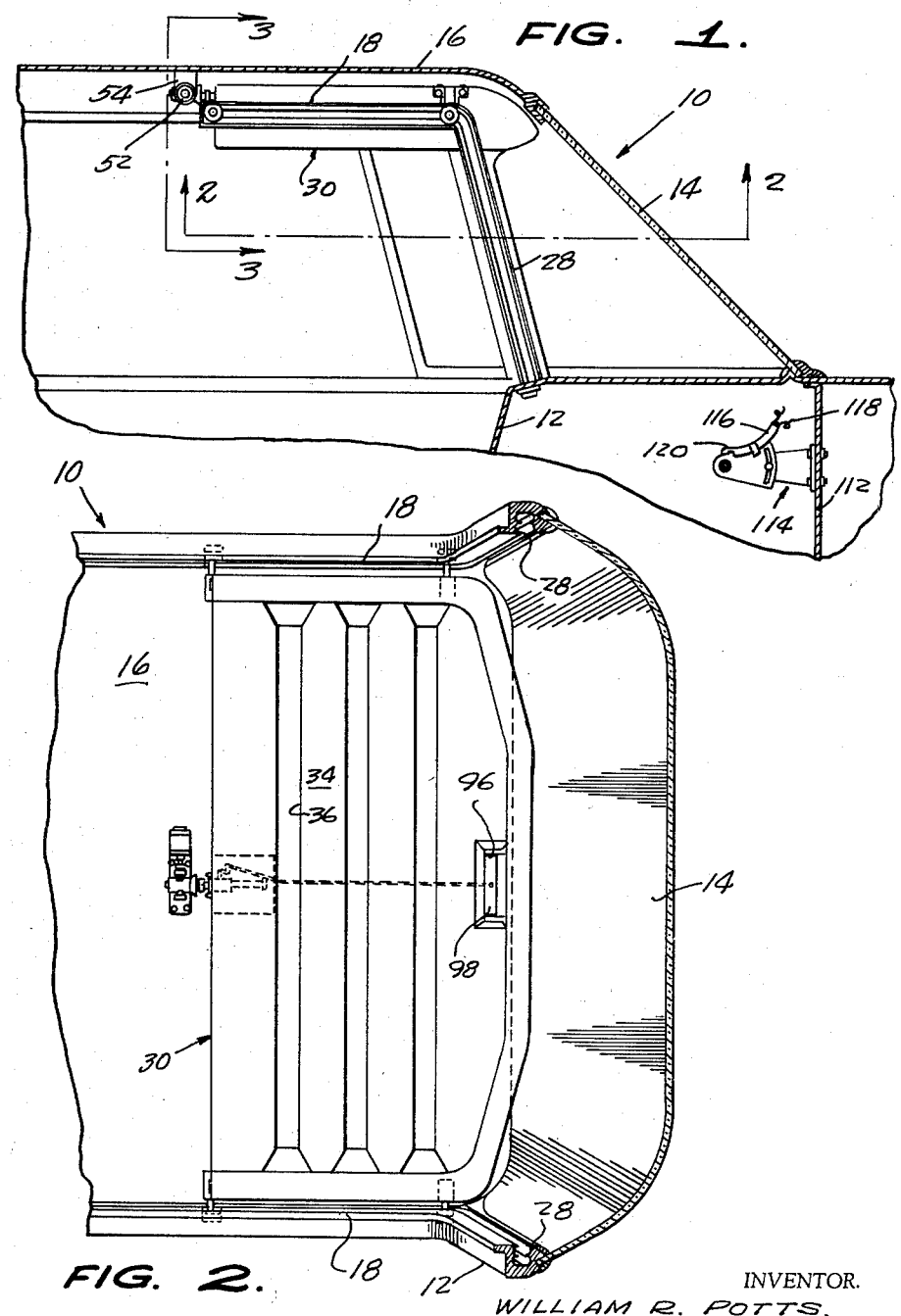
Figure 1 is a fragmentary sectional view, in elevation, of the forward portion of an automobile showing the upwardly sloping windshield and a portion of the roof, with the crash curtain of the present invention installed therein.
Figure 2 is a plan view looking upwardly on the line 2—2 of Figure 1.

Referring in greater detail to the drawings in which like numerals indicate like parts throughout the several views, the reference numeral 10 indicates an automobile generally and includes a frame 12, an upwardly and rearwardly sloping windshield 14 carried by the frame 12, and a roof 16 extending rearwardly of the windshield 14 adjacent the upper end of the latter and supported upon the frame 12. The present invention provides an overhead trackway 18 on each side of the frame, each trackway 18 having an open forward end and a closed rearward end and being fixedly positioned below the roof 16 so that it is in spaced parallel relation with respect to the roof with the forward end adjacent the upper end of the windshield 14 and with the rearward end remote the upper end of the windshield 14.

The trackways 18 are identical and are shown best in Figures 3 and 5. Each trackway 18 is composed of arcuately curved double rails 20 and 22 facing each other and supported upon the long leg of an L-shaped bracket 24. The lower end of the bracket 24 is secured to an inner roof member 26.

Another pair of trackways 28 each having one end open and the other end closed are arranged in upright directions and are spaced from the windshield 14 with the open end of each adjacent the forward end of the adjacent first-named trackway 18 and with the closed end of each trackway 28 forwardly of the forward end of the adjacent trackway 18 and adjacent the lower end of the windshield 14 as shown most clearly in Figure 1 with respect to the trackway 18 and the trackway 28 on the right-hand side of the automobile 10. The open end of each trackway 28 is connected in communication with the forward open end of the adjacent overhead trackway 18.

The present invention provides a crash curtain 30 fabricated of a rigid transparent sheet 32 extending from the forward end to the rearward end of the curtain 30 and having a plurality of slats 34 each fabricated of a shock-resistant material, such as sponge rubber or the like, arranged in transverse spaced relation and extending over and fixedly attached to the face of the sheet 32 remote from the roof 16 when the crash curtain 30 is positioned between the trackways 18 and supported thereon with the forward end of the curtain 30 adjacent the forward end of the trackways 18 and the rearward end of the curtain 30 is adjacent the closed end of the trackway 18. When the curtain 30 is supported within the trackway 18, the resilient slats 34 face away from the roof 16. The spaces between the adjacent slats 34, as at 36 in Figure 9, constitute sight openings permitting the occupant of the automobile 10 to see forwardly of the automobile through such openings when the curtain 30 is in the down position, as shown in Figure 9.

Releasable holding means is provided by the present invention normally engaging the curtain 30 for retaining the curtain 30 in position in the overhead trackway 18. Specifically, this releasing means embodies a horizontally disposed pin element 38 supported in a pair of depending and spaced brackets 40 attached to the underside of the roof 16, as shown in Figure 3. The pin element 38 is projectile and retractile through a sleeve 42 supported in one of the brackets 40 with a cap nut 44 extending over the free end portion of the sleeve 42 and enclosing a compression spring 46 having one end bearing against the inner face of the cap nut 44 and the other end bearing against a shoulder 48 provided on the pin element 38 inwardly of the end between the brackets 40.

A portion of the pin element 38 projects through an opening provided in the cap nut 44 and is upwardly connected to the core 50 of a solenoid 52 dependingly supported from the roof 16 on other brackets 54. The pin element 38 is squared off at its end, as shown most clearly in Figure 4.

The squared off end of the pin element 38 bears against a reduced portion of a rod member 56 which constitutes means provided by the curtain 30 engageable with the projectile and retractile pin element 38. A guide member 58 having one end portion 60 flared, as shown in Figure 4, is dependingly carried on the brackets 40 and receives one end portion of the rod member 56 when the curtain 30 is in the supported position in the overhead trackway 18. A collar 62 circumposed about the adjacent part of the rod member 56 prevents movement of the rod member 56 into the guide member 58 beyond a certain point.

A portion of the curtain 30 adjacent the rearward end thereof is cut away to form a pocket in which is inserted a housing 64 having a sloping forward end and a rear end provided with an opening 66 through which extends a guide sleeve 68. The guide sleeve 68 has a pair of trunnions 70 projecting from opposite sides thereof, sockets 72 encompassing the trunnions 70 for limited rotation about the trunnions 70 as horizontal axes, as shown most clearly in Figure 7. The sockets 72 are secured to the rearward edge of the curtain 30. A spring 74 extends between the inner end portion of the guide sleeve 68 within the housing 64 and the bottom of a recess 76 opening off of the housing 64 and surrounded by the resilient material making up the slots 34. Projecting laterally from the side of the guide sleeve 68 within the housing 64 is a nipple 78 closed on its outer end by a cap nut 80 having an aperture therethrough for the reception of a latch pin 82 retractile and extensile into and out of engagement with a recess 84 provided in the rod member 56. A head 86 carried on the free end of the latch pin 82 has a sloping face 88 engageable with a complementally sloping face 90 on the rod member 56 adjacent each of the recesses 84. A bell crank 92 has the end of one of its arms connected to the free end of the pin 82 and has the other of its arms secured to the end portion of a cable 94. The intermediate portion of the bell crank 92 is anchored for pivotal movement in a lug 96' projecting from the outer face of the cap nut 80. The cable 94 extends through the curtain 30 to a recess 96 provided in the forward edge portion of the curtain 30 intermediate the side edges thereof, the recess 96 having therein a handle 98 operatively connected to the other end of the cable 94. The engagement of the head 86 of the latch pin 82 with any of the recesses 84 in the rod member 56 is effected by manually pulling the cable 94 to release the head 86 from the one recess 84 and adjustment of the curtain 30 relative to the rod member 56 so that the latch pin 82 engages the rod member 56 at the selected position.

A spring 100 is circumposed about the latch pin 82 and biases the head 86 into engagement in one of the recesses 84 provided in the rod member 56. When it is desirable to use the curtain 30 as a sunshade the operator of the automobile 10 pulls on the handle 98 and releases the latch pin 82 and adjusts the curtain 30 downwardly to the proper level releasing the handle 98 so that the latch pin 82 again is engaged in one of the recesses 84. This latching arrangement is independent of the holding means and release means operatively connected to the holding means and actuable to release the holding means and to permit movement of the curtain 30 from the position within the overhead trackway 18 to a position wholly within the trackway 28 responsive to abrupt cessation of the forward travel of the automobile 10.

In Figure 3 it will be seen that the curtain 30 is formed with a contoured end portion to which is secured by screws 102 an obliquely arranged plate 104 secured to one side of a tubular member 106. The tubular member 106 constitutes a socket for a telescoping shaft 108 carrying on the outer end of a pair of side-by-side rollers 110 for rolling movement within the rails 20 and 22 of the adjacent trackway. The shaft 108 telescopes within the tubular member 106 in order to accommodate itself to the diverging lower end portions of the trackway 28. One or more sections may be added between the shaft 108 and the tubular member 106 to add length to the effective connection of the shaft 108 to the curtain 30. One roller 110 rolls on the bottom of the inside rail and the other roller on the top of the outside rail, which permits free rolling movement without noise.

An inertia operated switch is electrically connected to the solenoid 52 for energizing the latter responsive to sudden or abrupt cessation of travel movement of the automobile 10. This switch is shown in Figure 1 and is seen attached to the firewall 112 of the vehicle, the switch being designated generally by the reference numeral 114 and having an upwardly curved glass tube 116 positioned longitudinally of the automobile 10 with a pair of contact wires projecting into one end of the tube 116, as at 118. A small pool of mercury, as at 120, is movable along the length of the tube 116 responsive to the cessation of movement of the automobile 10 and makes momentary contact with the wires 118 shorting the latter and energizing the solenoid 52 for a period of time sufficient to release the pin element 38 from its engagement with the shoulder 122 adjacent the cut-away portion of the rod member 56. When the pin element 38 is disengaged from the rod member 56, the curtain 30 travels by virtue of its moment of inertia forwardly in the trackway 18 and downwardly in the trackway 28 to the position wholly within the trackway 28 and covering the windshield 14 of the automobile 10. The connection, shown in Figure 5, of the forward edge portion of the curtain 30 to the adjacent rollers 110 contains a sufficient number of telescoping elements, as at 124, to permit the telescoping movement of the associated roller shaft 108 outwardly to accommodate the widely diverging lower end portions of the trackway 28. A saddle member 126 secures each of the group of telescoping elements 124 to the adjacent edge of the curtain 30.

It will be seen therefore that the operation of the vehicle crash curtain according to the present invention is automatic and upon the abrupt stopping of the automobile 10, the curtain 30 is released from its held position in the trackway 18 and is permitted to move forwardly and downwardly into the trackway 28 bridging the windshield 14 and protecting the occupants from contact with the windshield 14 upon their forward movement responsive to such stopping or abrupt cessation of movement of the automobile 10.

While only a preferred embodiment of the present invention has been shown and described, other embodiments are contemplated and numerous changes and modifications may be made therein without departing from the spirit of the invention as set forth in the appended claims.

What is claimed is:

1. The combination with a vehicle having a frame, an upwardly and rearwardly sloping windshield carried by the frame, and a roof extending rearwardly of said windshield adjacent the upper end thereof and supported on said frame, an overhead trackway having an open forward end and a closed rearward end fixedly positioned below the roof on each side of said frame so that they are in spaced parallel relation with respect to the roof with the forward ends adjacent the upper end of the windshield and the rearward ends are remote from the upper end of the windshield, another pair of trackways each having one end open and the other end closed arranged in an upright direction fixedly positioned inwardly of and spaced from said windshield with the open end adjacent the forward end of the adjacent one of said first-named trackways and the closed end forwardly of the forward end of the adjacent one of said first-named trackways and adjacent the lower end of said windshield, the lower end portions of said another trackways diverging from each other, the open ends of said another trackways being connected in communication with the forward open ends of said overhead trackways, said trackways each comprising arcuately curved upper rails arranged in face-to-face spaced relation, a crash curtain having a forward end and a rearward end and including a rigid transparent sheet extending from the forward end to the rearmost end with a plurality of slats each fabricated of a shock-resistant material arranged in transverse spaced relation extending over and fixedly attached to one face to said sheet, the spaces between adjacent slats forming side openings, a tubular member on oposite sides of an end portion of said curtain, a telescoping shaft projecting from each of said tubular members and having on the outer end a pair of side-by-side rollers, said curtain being positioned in said overhead trackways so that the forward end is adjacent the forward ends of said overhead trackways and the rearward end is adjacent the closed ends of said overhead trackways with the slats facing away from said roof and having the side-by-side rollers with the telescoping shafts supported in said overhead trackways for free rolling movement, releasable holding means normally engaging said curtain for retaining said curtain in a position in said overhead trackways, and releasing means operatively connected to said holding means and actuable to release said holding means and permit movement of said curtain from the position within said overhead trackways to a postiion wholly within said another trackways with the shafts telescoped within said tubular members to accommodate its rollers to the diverging end portions of said another trackways responsive to abrupt cessation of the forward travel of said vehicle.

2. The combination according to claim 1, in which said holding means embodies a projectile and retractile pin element engageable with means provided on said curtain, a solenoid operatively connected to said element, and releasing means embodying an inertia operated switch electrically connected to said solenoid, said solenoid upon being energized effecting the retractile movement of said pin element.

References Cited in the file of this patent

UNITED STATES PATENTS

| | | |
|---|---|---|
| 2,180,912 | Rogers | Nov. 21, 1939 |
| 2,592,573 | Joncas | Apr. 15, 1952 |
| 2,715,042 | Lancaster | Aug. 9, 1955 |
| 2,854,281 | Cassin | Sept. 30, 1958 |

FOREIGN PATENTS

| | | |
|---|---|---|
| 870,071 | Germany | Mar. 9, 1953 |